United States Patent [19]
Harada et al.

[11] Patent Number: 4,926,302
[45] Date of Patent: May 15, 1990

[54] SWITCHING POWER SOURCE DEVICE

[75] Inventors: Koosuke Harada; Hiroshi Sakamoto, both of Fukuoka, Japan

[73] Assignee: Nishimu Electronics Industries Co., Ltd., Fukuoka, Japan

[21] Appl. No.: 187,288

[22] Filed: Apr. 28, 1988

[30] Foreign Application Priority Data

May 7, 1987 [JP] Japan .................................. 62-112218

[51] Int. Cl.$^5$ ........................................ H02M 3/335
[52] U.S. Cl. ...................................... 363/16; 363/26; 363/132
[58] Field of Search ..................... 363/16-26, 363/56, 97, 98, 131-137; 323/271, 272

[56] References Cited

U.S. PATENT DOCUMENTS

| | | | |
|---|---|---|---|
| 3,978,393 | 8/1976 | Wisner et al. | 323/272 |
| 4,585,986 | 4/1986 | Dyer | 363/132 |
| 4,594,649 | 6/1986 | Rhoads et al. | 363/21 |
| 4,685,039 | 8/1987 | Inou et al. | 363/16 |
| 4,691,272 | 9/1987 | Geus | 363/132 |

Primary Examiner—Peter S. Wong
Attorney, Agent, or Firm—Kinney & Lange

[57] ABSTRACT

A switching power source device provides a desired AC/DC output by producing a pulse width-modulated waveform through ON-OFF control of a pair or pairs of switching elements connected in series with an input power source, eliminating high-frequency components of the pulse width-modulated waveform with a smoothing choke. The switching power source device is configured so that the input power source will not be short-circuited and consequently suffer a voltage and/or current surge, even when both switching elements in the pair assume the ON status at the same time by dividing the smoothing choke into two portions. The two portions of the smoothing choke are connected in series with the input power source when the switching elements in the pair assume the ON status at the same time.

13 Claims, 3 Drawing Sheets

SWITCHING POWER SOURCE DEVICE

BACKGROUND OF THE INVENTION

(1) Field of the Invention

This invention relates to a switching power source device for supplying a desired AC/DC output by producing a pulse width-modulated waveform through ON-OFF control of switching elements serially connected to an input power source. The device eliminates high-frequency components of the pulse width-modulated waveform with a smoothing choke (hereinafter this operation will be referred to as "smoothing").

This invention particularly relates to a switching power source device which, in a system designed to control the output by alternatively switching a plurality of switching elements connected in pairs as in push-pull connection or bridge connection, precludes a current-/voltage surge induced in consequence of the on/off control of the switching elements by dividing the smoothing choke into two portions. This device can be efficiently utilized in an AC uninterruptable power source system, a controller drive system for motors, a DC constant voltage power source system, etc.

(2) Description of the Prior Art

The switching power source device has the virtues of small size and high efficiency, and therefore, finds extensive utility as a power source device in many fields such as data processing systems. The power source devices having a relatively large power capacity, and the AC power source devices designed to derive a sine-wave AC output from a DC input power source, are among the power source devices of this principle. For those power source devices which are adapted to effect control of output power by alternately switching a plurality of switching elements connected in pairs, the push-pull connection or bridge connection are employed more often than not.

FIG. 1 is a schematic structural diagram illustrating a typical switching power source device of the conventional principle ("Power Semiconductor Circuits," pages 357–358, written by S. B. Dewan & A. Strengthen and published John Wiley & Sons, 1975). FIG. 2 is a waveform diagram illustrating the operating principle of the power source device in FIG. 1.

As illustrated in FIG. 1, a pair of DC power sources 51, 52 are serially connected to each other and a pair of switches 1, 2 are serially connected to the opposite terminals thereof. A choke coil 3 is inserted between a connecting node 7 of the switches 1,2 and an output terminal 10. A capacitor 4 is inserted between a connecting node B of the DC power sources 51 52 and the output terminal 10. A load 6 is connected with capacitor 4 in parallel between the node 8 and the output terminal 10. To the switches 1, 2, feedback diodes D1, D2 are respectively connected in parallel so as to be reverse biased by the power sources 51, 52.

During the operation of the switching power source device, when the switch 1 and the switch 2 are alternatively turned ON and OFF and the time ratio thereof is controlled in the form of a sine wave as illustrated in FIG. 2 (a), a voltage of rectangular waveform having the pulse width modulated as illustrated in FIG. 2 (a) is generated at the node 7. When the voltage of this rectangular waveform is deprived of high-frequency components with a filter (LPF) which is formed of the choke coil 3 and the capacitor 4, an AC output of sine waveform as illustrated in FIG. 2 (b) is obtained at the output terminal 10. This output is applied to the load 6.

Here no problem would arise if the switches 1, 2 are ideal switching elements and the signals for effecting ON-OFF control of these switches are ideal rectangular waveforms. In the actual device, however, various problems are posed because of characteristic properties inherent in the switching elements. The problems will be discussed below.

FIG. 3 illustrates working examples of the switches 1, 2 illustrated, in FIG. 1. The symbols used in FIG. 3 which are the same as those used in FIG. 1 denote the same features in each.

FIG. 3 (a) represents a case using bipolar transistors as switching elements. In this case when a signal for turning OFF transistor 1 is given to the base thereof and signal for turning ON a transistor 2 is given to the base thereof for causing a first state having transistor 1 in the ON status and transistor 2 in the OFF status, a reverse of these signals will cause a second state having the transistor 2 conversely in the ON status and, the transistor 1 in the OFF status. There is the possibility in doing this switching that the transistor 1 which has been in the ON status will be delayed by the storage time thereof in responding to the turn-off signal and, as a result, the two transistors 1 and 2 may both assume the ON status.

In this state, the power sources 51, 52 in FIG. 1 would be short-circuited via the transistors 1, 2 possibly to induce flow of unduly large current through the two transistors and cause breakage thereof. The storage time, as widely known, is the duration in which the transistor is forced by the excess carriers remaining in the base thereof to retain the ON status even after the supply of base current is cut off in response to the turn-off signal.

Numerous devices of the prior art allow for dead time (the duration in which the two transistors both remain in the OFF status) so as to preclude the two transistors from assuming the ON status at the same time ("Mospower Applications Handbook", pages 5-87 to 5-88, published by Siliconix Incorporated in 1984). Since the storage time is variable with the magnitudes of load current and ambient temperature, for example, it is not easy to attain accurate control of the dead time.

FIG. 3 (b) illustrates the case of using MOSFET's as switching elements. In this case, there is no possibility of the two FET's both assuming the ON status at the same time because of storage time due to residual carriers. However, since the static capacity between the drain and the source is large (ranging generally from hundreds to thousands of pF), there is the possibility that when one of the FET's is turned ON, the FET's both may assume the ON status at the same time because of a large dv/dt ratio (sharp change of voltage) occurring between the drain and the source of the other FET. As the result, the power sources are short-circuited by these FET's to permit flow of a surge current.

FIG. 3 (c) illustrates a case using GTO's (gate turn-off thyristors) as switching elements. In such switching elements as GTO's which possess self-retaining characteristics, there is the possibility that when one of the two switching elements is turned ON, the other switching element may be compelled to permit flow of an anode current by the dv/dt occurring between the opposite terminals thereof. This anode current partly finds its way to the gate to turn ON the other switching element which has been in the OFF status and, thus, bring about the possibility of the two switching elements assuming the ON status at the same time.

In any switching power source device using a plurality of switching elements connected in pairs, it is an ideal as may be surmised from the description given above, that the turn-on action of one of the two switching elements in any of the pairs and the turn-off action of the other switching element of the pair take place at exactly the same moment.

Generally the switching elements fail to produce, such ideal switching actions as described above, and there is a duration in which the switching elements in a pair assume the ON status at the same time or, conversely, the OFF status at the same time. As the result, these switching elements incur a current surge and/or a voltage surge.

For the protection of the switching elements against the current/voltage surge, and for the preclusion of the occurrence of noise due to the surge, the devices of the prior art have been adapted to absorb the surge current and voltage through inserting saturable magnetic cores 81, 82 in series therewith, or connecting snubber circuits 71, 72 in parallel to the switching elements 1, 2 as illustrated in FIG. 4, each snubber circuit consisting of a resistor and a capacitor in series. Since these measures are incapable of completely preventing the phenomenon of surge, however, the relevant switching elements and consequently the power source devices using them still suffer from insufficient reliability. Further, since the power consumed by the surge-absorbing elements and the heat generated thereby are substantially proportional to the speed and number of switching actions involved, the devices using such surge-absorbing elements have a disadvantage that an increase in the switching frequency is obtained only with difficulty.

SUMMARY OF THE INVENTION

This invention has been produced for the purpose of eliminating the various drawbacks of the prior art described above. The primary object of this invention is to provide a switching power source device for attaining a desired AC/DC output by ON-OFF control of at least one pair of switching elements connected to an input power source, with this switching power source device being configured so that input power sources will not be short-circuited and consequently suffer to a voltage and/or current surge even when the switching elements in the pair assume the ON status at the same time.

Another object of this invention is to provide a switching power source device which permits an increase in the switching frequency and obviates the necessity for a surge-absorbing element, thereby enhancing the power source efficiency and, at the same time, allowing for a decrease in the volume and weight of the device, to increase the operational reliability of the device, and improve its economy.

DETAILED DESCRIPTION OF THE PREFERRED EMBODIMENTS

Figure 1:
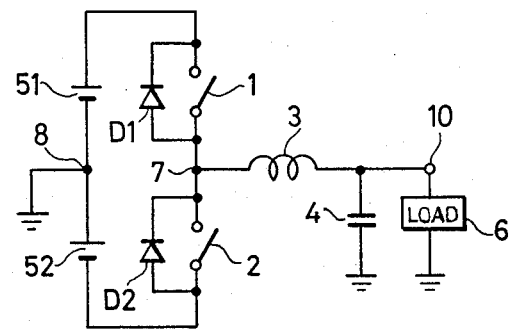
FIG. 1 is a circuit diagram illustrating a typical switching power source of the prior art.
Figure 6:
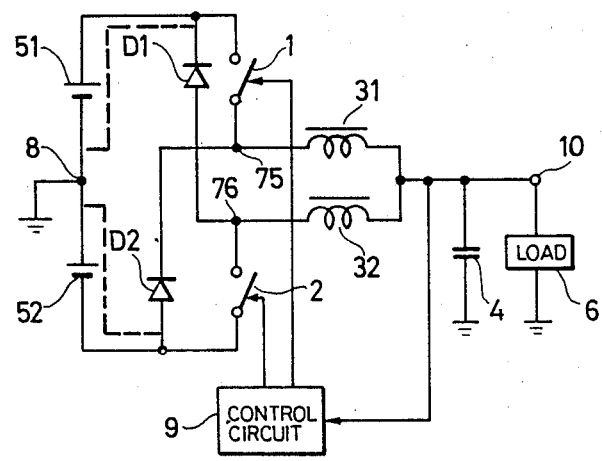

FIG. 6 is a circuit diagram of one embodiment of this invention in a half-bridge type switching power source device. The symbols used in this diagram that are the same that was used in FIG. 1 denote similar features in each. The control of the output voltage is accomplished as for the device in FIG. 1, by alternatively turning ON and OFF a pair of switches 1 and 2 and controlling the time ratio of the switching actions involved. The difference of the device of this embodiment from the conventional device of FIG. 1 resides in the fact that the choke coil in FIG. 1 for smoothing is divided into two parts 31, 32 in FIG. 6.

The first series circuit interconnecting a DC power source 51 and a switching element 1 is connected via one choke coil 31 to an output terminal 10, and the second series circuit interconnecting a DC power source 52 and a switching element 2 is connected via the other choke coil 32 to the output terminal 10. The cathode terminal of a feedback diode D2 is connected to a node 75 of the switching element, and the choke coil 31 with its anode connected to the negative side of source 52 and the anode terminal of a feedback diode D1 is connected to a node 76 of the switching element 2 and the choke coil 32 with its cathode connected to the positive side of source 51. Alternatively, the cathode of diode D1 and the anode of diode D2 can be connected to center tap 8 between the negative side of source 51 and the positive side of source 52, as shown by the dashed line alternative interconnection in FIG. 6.

Figure 2:
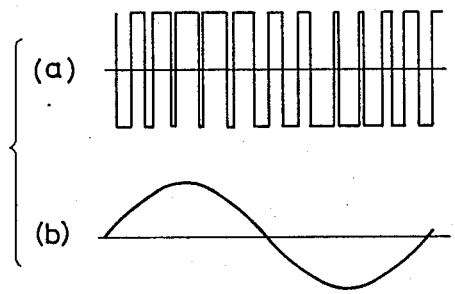
FIG. 2 is a time chart depicting the operation of the device of FIG. 1.

A control circuit 9, similar to the conventional switching power source device, incorporates therein a DC or AC standard voltage source (not shown), compares the voltage or current at the output terminal 10 with the standard voltage, issues a time-ratio control signal based on the deviation found by the comparison, and effects the time-ratio control of the switching elements 1, 2 as shown in FIG. 2 (a). The pulse voltage obtained by the time-ratio control of the switching elements, namely the voltage of the pulse-width modulated rectangular waveform as illustrated in FIG. 2 (a), is smoothed by being passed through LPF's which are formed respectively of the choke coils 31 and 32 and the capacitor 4.

The switching elements 1 and 2 are coupled through their respective series-connected smoothing choke coils 31, 32 to the capacitor 4 in a low frequency (or DC) portion. Because of this, any sharp change in voltage, for example, which is produced at the opposite terminals (node 75 or 76) of either of the switching elements in consequence of the actuation of the relevant switching element, is absorbed by the series-connected choke coils and the parallel-connected capacitor, with the result that the otherwise possible direct transfer of the change in the voltage in one of the switching elements to the other switching element is precluded.

Further in the present embodiment, even when the switching elements 1, 2 are both in the ON status at the same time in consequence of switching the status of each switching elements, the possibility of the power sources 51, 52 being short-circuited is completely absent because the smoothing choke coils 31, 32 are serially inserted in the series circuits interconnecting the power sources 51, 52 and the switching elements 1, 2.

Thus, the ON-OFF control can be effected in which the two switching elements are permitted to be in ON status at the same time and providing a dead time in which the two switching elements are in OFF status at the same time is not required. Even in the case of that the two switching elements being in ON status at the same time, the transient current passing through the two switching elements and consequently the surge current and/or the surge voltage are prevented completely.

The power source device of the present embodiment, therefore, has no use for the surge-absorbing elements which have been indispensable to the conventional power source device. It further permits an increase in the switching frequency because the overall power consumption due to the ON-OFF actions of the switching elements is small. As a result, such smoothing elements as choke coils and capacitors are allowed to be reduced in size and weight, and at the same time, the control of the output voltage is enabled to respond with enhanced rapidity such as to realize fine and accurate control of the instantaneous magnitude of output voltage.

Figure 7:
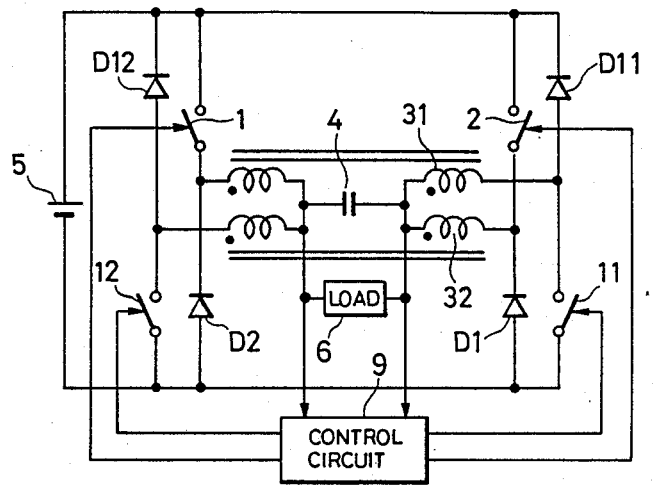

FIG. 7 is a schematic circuit configuration of the second embodiment of the present invention in a full-bridge type switching power source device. Information on the basic structure and operation of a full-bridge type switching power source device is given at pages 357 and 358 of the aforementioned book, "Power Semiconductor Circuits."

As illustrated in FIG. 7, additional switching elements 11, 12 constitute themselves a pair and are controlled so that one of them assumes the OFF status while the other assumes the ON status. Diodes D11, D12 are equivalent to the feedback diodes D1, D2 mentioned previously. The switching elements 1, 11 as one pair are ON-OFF controlled synchronously in the same phase and the switching elements 2, 12 as the other pair are ON-OFF controlled synchronously in the opposite phase. At the opposite terminals of the capacitor 4 and the load 6 which are connected in parallel, therefore, an output voltage of the shape shown in FIG. 2 (b) is produced. Since the second embodiment likewise uses divided smoothing choke coils 31, 32, it is enabled to bring about the same effects as described above with respect to the first embodiment.

Figure 8:
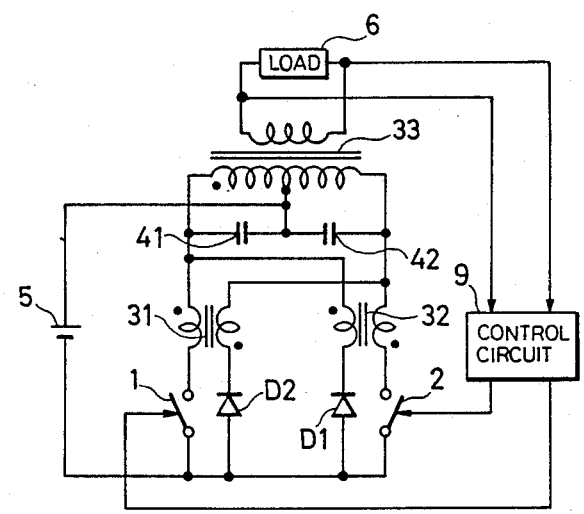

FIG. 8 is a schematic circuit configuration of the third embodiment of this invention in a push-pull type switching power source device. Information on the basic structure and operation of the push-pull type switching power source device is given at pages 48 to 54 of "Principles of Inverter Circuits," written by B. D. Bedford & R.R. Hoft and published by John Wiley & Sons in 1964.

The opposite terminals of the primary winding of a transformer 33 are connected via choke coils 31, 32 and switching elements 1, 2 to one pole of a DC power source 5 and the other pole of the DC power source 5 is connected to the neutral point of the primary winding of the transformer 33. Capacitors 41, 42 are inserted between the neutral point of the primary winding and the two opposite terminals. To the secondary winding of the transformer 33 is connected a load 6.

In the embodiment of FIG. 8, there are used divided smoothing choke coils 31, 32 and the pair of switching elements 1, 2 are ON-OFF controlled synchronously but in opposite phases. As the result, a sine wave output as shown in FIG. 2 (b) is produced in the secondary winding of the transformer 33. It will be readily understood that the present embodiment will being about the same effects as described above with respect to the first embodiment.

Figure 5:
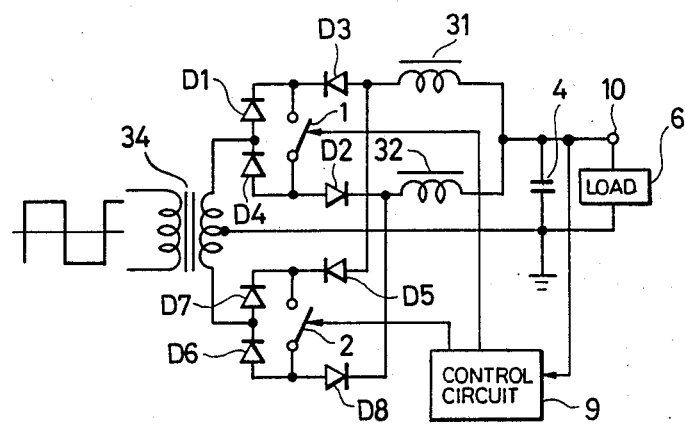
FIG. 5 to FIG. 8 are circuit diagrams illustrating respectively the first through fourth embodiments of this invention.

FIG. 5 illustrates the fourth embodiment of this invention implemented by the inventors in the form of a high-frequency phase difference control type power source device disclosed in the specification of copending U.S. Patent Application Ser. No. 95,322.

To the primary winding of a transformer 34 is applied a high-frequency voltage of rectangular waveform as illustrated in the diagram. Where the upper terminal of the secondary winding of the transformer 34 is positive, the current flows through a circuit from the upper terminal through a diode D1, a switching element 1, a diode D2, a choke coil 32, and a capacitor 4 (load 6) to the neutral point of the transformer when the switching element 1 is in the ON status and the switching element 2 in the OFF status. For the same transformer 34 secondary winding polarity, the current flows through a circuit from the neutral point through the capacitor 4 (load 6), the choke coil 31, the diode D5, the switching element 2, and the diode D6 to the lower terminal when the switching element 1 is in the OFF status and the switching element 2 is in the ON status.

Conversely where the lower terminal of the secondary winding of the transformer 34 is positive, the current flows through a circuit from the neutral point of the transformer through the capacitor 4 (load 6), the choke coil 31, the diode D3, the switching element 1, and the diode D4 to the upper terminal when the switching element 1 is in the ON status and the switching element 2 in the OFF status. For the same transformer 34 secondary winding polarity, current flows through a circuit from the lower terminal through the diode D7, the switching element 2, the diode D8, the choke coil 32, and the capacitor 4 (load 6) to the neutral point when the switching element 1 is in the OFF status and the switching element 2 is in the ON status.

In this embodiment, the control of the output voltage produced between the opposite terminals of the capacitor 4 or the load 6 is effected by regulating the difference between the phase of the voltage of high-frequency rectangular waveform applied to the primary winding of the transformer 34 and the phase of the ON-OFF switching effected on the switches 1, 2 connected to the secondary winding.

Since the embodiment of FIG. 5 likewise uses two separate smoothing choke coils, it is similar to the embodiment of FIG. 6 in being able to preclude the occurrence of voltage/current surge and attain the same effects as those described above with ease.

Figure 3:
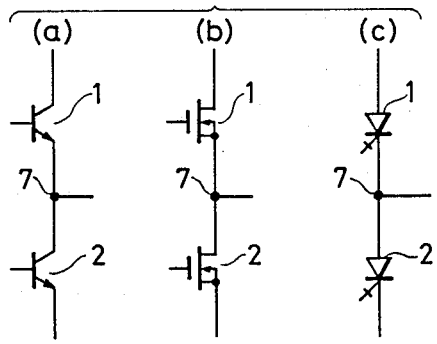
FIG. 3 is a circuit diagram of typical switching elements.
Figure 4:
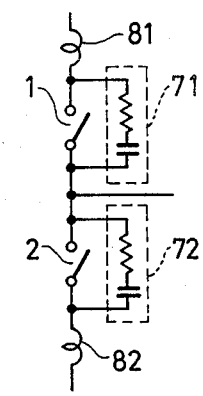
FIG. 4 is a circuit diagram of a surge-preventing device.

As described above, in the embodiments of the present invention, bipolar transistors, MOSFET's, GTO's, and thyristors can be used as effectively as in the conventional switching elements. Further when drive signals of rectangular waveform having exactly opposite phases are used as ON-OFF control signals for the switches connected in pairs, a duration in which the two switches are in the ON status at the same time is likely to exist because of the parasitic capacity, the storage time, etc. of the semiconductor switches as described above with respect to FIG. 3. Thus, the occurrence of voltage/current surge can be precluded substantially completely without requiring any extra measure because the two switching elements happen to assume the ON status at the same time.

As is clear from the description given above, this invention permits in a simple form effective prevention in a switching power source device of the phenomenon of current/voltage surge or noise which has been heretofore attained only with a complicated and hardly practical measure. Thus, this invention accomplishes an economical device.

What is claimed is:

1. A switching power source device comprising:
    a first series circuit of a first switching element and a first smoothing choke coil connected between a first supply terminal adapted for electrical connection to a source of voltage and a first output terminal adapted for connection to a load device,
    a second series circuit of a second switching element and a second smoothing choke coil connected between a second supply terminal adapted for electrical connection to a source of voltage and the first output terminal,
    a smoothing capacitor one terminal of which is connected to said first output terminal, and another terminal of which is connected to a center tap terminal to serve as a second output terminal adapted for connection to a load device, the center tap terminal also being adapted for electrical connection to a further source of voltage, and
    means for ON-OFF controlling said first and second switching elements in such a manner that one of said switching elements assumes an ON status while the other switching element assumes an OFF status and vice versa.

2. The switching power source device according to claim 1, wherein a first terminal of the first switching element is connected to the first supply terminal, a second terminal of the second switching element is connected to the second supply terminal, a first terminal of said first smoothing choke coil is connected to a second terminal of said first switching element, a first terminal of said second smoothing choke coil is connected to a first terminal of said second switching element, a second terminal of each of the first and the second smoothing choke coils is connected in common with the other and to the first output terminal, and one of a pair of feedback diodes is respectively connected between the node at the connection of a said switching element and a first terminal of a said smoothing choke coil in one of said series circuits and that one of said first and second supply terminals opposite the one connected to that switching element.

3. The switching power source device according to claim 2, wherein the polarities of said feedback diodes connected to said first terminals of said smoothing choke coils are opposite one another.

4. The switching power source device according to claim 1, wherein at least one of said first and second switching elements is a semiconductor switching element.

5. The switching power source device according to claim 1, wherein voltage sources are electrically connected to said first and second supply terminals and to said center tap terminal with values such that a selected one of said first and second supply terminals has a voltage value thereon greater than that on the other and, to a smaller extent, greater than that on the center tap terminal.

6. The switching power source device according to claim 5, wherein said voltage sources are operated so that the one of said first and second supply terminals selected to have the greater voltage thereon alternates between them to result in the voltage values supplied following a rectangular waveform.

7. The switching power source device according to claim 1, wherein a first terminal of the first switching element is connected to the first supply terminal, a second terminal of the second switching element is connected to the second supply terminal, a first terminal of said first smoothing choke coil is connected to a second terminal of said first switching element, a first terminal of said second smoothing choke coil is connected to a first terminal of said second switching element, a second terminal of each of the first and the second smoothing choke coils is connected in common with the other and to the first output terminal, and one of a pair of feedback diodes is respectively connected between the node at the connection of a said switching element and a first terminal of a said smoothing choke coil in one of said series circuits and the center tap terminal.

8. The switching power source device according to claim 7, wherein the polarities of said feedback diodes connected to said first terminals of said smoothing choke coils are opposite one another.

9. A switching power source device comprising:
    a first series circuit of a first switching element and a first smoothing choke coil connected between a first supply terminal adapted for electrical connection to a source of voltage and one of a pair of output terminals,
    a second series circuit of a second switching element and a second smoothing choke coil connected between a second supply terminal and that same one of the pair of output terminals,
    a third series circuit of a third switching element and a third smoothing choke coil connected between the first supply terminal and the other one of said pair of output terminals,
    a fourth series circuit of a fourth switching element and a fourth smoothing choke coil connected between the second supply terminal and the other one of the pair of output terminals,
    a smoothing capacitor connected between said two output terminals, and
    means for ON-OFF controlling said first, second, third and fourth switching elements in such a manner that the first and fourth switching elements assume ON status while the second and third switching elements assume OFF status, and vice versa.

10. The switching power source device according to claim 9, wherein each node at the connection of a switching element and a smoothing choke coil has a diode connected between it and that one of said first and second supply terminals that is opposite to the one connected to that switching element.

11. A switching power source device comprising:
    an output transformer having a primary winding with a center tap terminal adapted for connection to a source of voltage, and a secondary winding,
    a first series circuit of a first switching element and a first smoothing choke coil connected between a first terminal of the primary winding and a supply terminal,
    a second series circuit of a second switching element and a second smoothing choke coil connected between a second terminal of the primary winding and the supply terminal, a pair of smoothing capacitors each connected between one of the primary winding first and second terminals and the center tap terminal, a pair of output terminals provided by a pair of terminals in the secondary winding, and means for ON-OFF controlling said first and second switching elements in such a manner that one of said switching elements assumes an ON status while the other switching element assumes an OFF status and vice versa.

12. A switching power source device comprising:

an input high frequency transformer having a primary winding and a secondary winding, a first series circuit comprising a first forward diode, a first switching element, a second forward diode and a first smoothing choke coil which are connected in mentioned order from one terminal of the secondary winding to an output terminal, a second series circuit comprising a second smoothing choke coil, fifth forward diode, a second switching element and sixth forward diode which are connected in mentioned order from the output terminal to the other terminal of the secondary winding, a third diode forwardly connected from the node of the second smoothing choke coil and the fifth diode to the node of the first diode and the first switching element, a fourth diode forwardly connected from the node of the second diode and the first switching element to the one terminal of the secondary winding, a seventh diode forwardly connected from the other terminal of the secondary winding to the node of the second switching element and fifth diode, an eighth diode forwardly connected from the node of the second switching element and the sixth diode to the node of the second diode and the first smoothing choke coil, a smoothing capacitor connected between the output terminal and a center tap of the secondary winding, and means for ON-OFF controlling said first and second switching elements in such a manner that the first switching element assumes ON status while the second switching element assumes OFF status, and vice versa.

13. The switching power source device according to claim 12, wherein a rectangular waveform voltage is applied to the primary winding of the input high frequency transformer.

* * * * *